United States Patent
Uzawa et al.

(10) Patent No.: US 7,249,216 B2
(45) Date of Patent: Jul. 24, 2007

(54) DATA RELAY APPARATUS, CONTENT ADDRESSABLE/ASSOCIATIVE MEMORY DEVICE, AND CONTENT ADDRESSABLE/ASSOCIATIVE MEMORY DEVICE USE INFORMATION SEARCH METHOD

(75) Inventors: Yuichi Uzawa, Yokohama (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 11/055,330

(22) Filed: Feb. 10, 2005

(65) Prior Publication Data

US 2005/0165958 A1   Jul. 28, 2005

Related U.S. Application Data

(63) Continuation of application No. PCT/JP02/13042, filed on Dec. 12, 2002.

(51) Int. Cl.
    G06F 12/00  (2006.01)
(52) U.S. Cl. ......................... 711/108; 365/49
(58) Field of Classification Search ...................... None
    See application file for complete search history.

(56) References Cited

U.S. PATENT DOCUMENTS

| | | | |
|---|---|---|---|
| 5,956,336 A | 9/1999 | Loschke et al. | |
| 5,978,245 A | 11/1999 | Hata et al. | |
| 6,411,626 B1 | 6/2002 | Shinohara | |
| 6,457,001 B1 | 9/2002 | Ishida | |
| 6,788,683 B1 | 9/2004 | Ikeda | |
| 6,954,823 B1 * | 10/2005 | James et al. | 711/108 |
| 7,042,748 B2 * | 5/2006 | Khanna | 365/49 |
| 7,117,301 B1 * | 10/2006 | James et al. | 711/108 |
| 2002/0067722 A1 | 6/2002 | Kanakubo | |
| 2002/0073222 A1 | 6/2002 | Sonoda et al. | |

FOREIGN PATENT DOCUMENTS

| | | |
|---|---|---|
| EP | 0 833 257 | 4/1998 |
| JP | 8-087441 | 4/1996 |
| JP | 9-180468 | 7/1997 |
| JP | 10-125079 | 5/1998 |
| JP | 10-126422 | 5/1998 |
| JP | 10-322354 | 12/1998 |
| JP | 11-272676 | 10/1999 |
| JP | 2000-099394 | 4/2000 |

(Continued)

OTHER PUBLICATIONS

Japanese Office Action dated Apr. 11, 2006 for corresponding Japanese Application 2004-558387.

*Primary Examiner*—T Nguyen
(74) *Attorney, Agent, or Firm*—Katten Muchin Rosenman LLP

(57) ABSTRACT

A data relay apparatus in which a search request command can be inputted efficiently to a content addressable/associative memory device. When a packet is inputted, a network processor generates a search request and passes it to the content addressable/associative memory device. Then the content addressable/associative memory device analyzes the structure of the search request and generates a plurality of search conditions. The content addressable/associative memory device makes a search according to each search condition and outputs a memory address corresponding to a detected piece of information to be searched to a memory device. The memory device passes a candidate search result corresponding to the memory address to the network processor as a search result.

12 Claims, 17 Drawing Sheets

FOREIGN PATENT DOCUMENTS

| | | |
|---|---|---|
| JP | 2000-231785 | 8/2000 |
| JP | 2000-252990 | 9/2000 |
| JP | 2001-156840 | 6/2001 |
| JP | 2002/176431 | 6/2002 |
| JP | 2002-176437 | 6/2002 |

* cited by examiner

DATA RELAY APPARATUS, CONTENT ADDRESSABLE/ASSOCIATIVE MEMORY DEVICE, AND CONTENT ADDRESSABLE/ASSOCIATIVE MEMORY DEVICE USE INFORMATION SEARCH METHOD

CROSS-REFERENCE TO RELATED APPLICATION

This application is a continuing application, filed under 35 U.S.C. §111(a), of International Application PCT/JP2002/013042, filed on Dec. 12, 2002, the contents of which are herein wholly incorporated by reference.

BACKGROUND OF THE INVENTION (1) Field of the Invention

This invention relates to a data relay apparatus for relaying a packet transmitted, a content addressable/associative memory device used in such a data relay apparatus, and a content addressable/associative memory device use information search method for searching for information regarding a packet by using such a content addressable/associative memory device and, more particularly, to a data relay apparatus, a content addressable/associative memory device, and a content addressable/associative memory device use information search method for improving efficiency in information search.

(2) Description of the Related Art

In devices (data relay apparatus), such as routers and switches, which connect networks, a routing process is performed on the basis of the destinations of packets sent over the networks. Such a routing process may be performed by software with a general-purpose computer or may be performed by dedicated hardware.

If a routing process must be performed at high speed, usually dedicated hardware will be used for packet routing. In this case, each data relay apparatus includes a processor (network processor) dedicated to routing.

Such a network processor refers to various pieces of information, such as an internet protocol (IP) address, regarding a packet inputted and determines a physical port to which it should be outputted. Usually network processors include a memory for storing the IP addresses of terminal units connected to their physical ports. When a packet is transmitted, the contents of the memory are referred to. By doing so, a physical port to which the packet should be outputted can be specified.

As stated above, routing always involves memory access in a data relay apparatus. Accordingly, to perform routing at high speed, it is necessary to improve efficiency in memory access. For example, a command access circuit (or memory control circuit) for buffering a command is located between a central processing unit (CPU) and a memory as a technique for improving efficiency in access from the CPU to the memory (see, for example, Japanese Patent Unexamined Publication No. 8-87441 or No. 2000-99394).

In addition, a special memory referred to as a content addressable/associative memory (CAM) device is used especially for high-speed large-capacity routing. A routing circuit using a CAM device is also referred to as a network search engine.

A CAM device stores information, such as IP addresses. When information, such as an IP address, is inputted, the memory address of a storage area where the information is stored is outputted. CAM devices are used not only in data relay apparatus but also in various systems as high-speed memories (see Japanese Patent Unexamined Publication No. 2000-231785, paragraph [0023]).

By the way, there are cases where a network processor accesses a memory more than one time to search for a route for one packet. For example, IP addresses (source address (SA) and destination address (DA)) and port numbers (source port number and destination port number) used in, for example, Transmission Control Protocol (TCP)/User Datagram Protocol (UDP) are extracted from a packet and an IP address search and a port number search are made. That is to say, a search is made twice.

A route search process involving accessing a CAM device more than one time will now be described.

FIG. 17 shows a conventional route search process involving accessing a CAM device more than one time. As shown in FIG. 17, a data relay apparatus includes a network processor 911, a CAM device 912, and a context random access memory (RAM) 913. An IP address storage area and a port number storage area are included in a storage area in the CAM device 912. In this example, an IP address search and a port number search are made to transmit one packet. That is to say, a search is made twice.

[Step S101] When packet information is inputted to the data relay apparatus, the network processor 911 sends a search key 921, a mask setting command 922, and a search command 923 to the CAM device 912. The search key 921 is an IP address. The mask setting command 922 is a command for designating the process of masking an area in the CAM device 912 other than the IP address storage area (process of excluding an area in the CAM device 912 other than the IP address storage area from an area to be searched).

The CAM device 912 masks the area specified by the mask setting command 922. The masked area is excluded from an area to be searched. The CAM device 912 searches for data which matches the search key 921, and outputs the memory address of an area where data is stored. The memory address outputted is inputted to the context RAM 913 as a read memory address. Then data 924 is outputted from an area in the context RAM 913 corresponding to the memory address inputted to the network processor 911. This search process is performed in the Layer 3 (network layer).

[Step S102] Next, the network processor 911 sends a search key 931, a mask setting command 932, and a search command 933 to the CAM device 912. The search key 931 is a port number indicative of a destination application to which the packet is transmitted. The mask setting command 932 is a command for designating the process of masking an area in the CAM device 912 other than the port number storage area.

The CAM device 912 masks the area specified by the mask setting command 932. The CAM device 912 searches for data which matches the search key 931, and outputs the memory address of an area where the data is stored. The memory address outputted is inputted to the context RAM 913 as a read memory address. Then data 934 is outputted from an area in the context RAM 913 corresponding to the memory address inputted to the network processor 911. This search process is performed in the Layer 4 (transport layer).

To provide a service, such as quality of service (QoS), it is necessary to identify a flow not only by IP addresses (SA and DA) in the Layer 3 but also by information in the Layer 4. Accordingly, a search is made twice.

However, if a CAM device is accessed more than one time to transmit one packet, a mask setting command and a search command are issued each time a search is made. This increases the number of times a CAM device is accessed and degrades the performance of a network processor. Therefore, to perform processes, such as packet routing, at higher speeds, it is hoped that commands will be transmitted more efficiently at the time of access to a CAM device.

SUMMARY OF THE INVENTION

The present invention was made under the background circumstances described above. An object of the present invention is to provide a data relay apparatus capable of efficiently inputting a search request command to a content addressable/associative memory (CAM) device.

Another object of the present invention is to provide a content addressable/associative memory device to which a search request command can be inputted efficiently.

Still another object of the present invention is to provide a content addressable/associative memory device use information search method by which a search request command can be inputted efficiently to a content addressable/associative memory device.

In order to achieve the above first object, a data relay apparatus for relaying a packet transmitted is provided. This data relay apparatus comprises a network processor for outputting, at the time of the packet being inputted, a search request including a plurality of elements in the packet treated as a plurality of search keys and a plurality of pieces of applied mask information each of which indicates an area to be searched by each of the plurality of search keys; a content addressable/associative memory device for storing in advance a plurality of pieces of information to be searched, accepting the search request outputted from the network processor, generating a plurality of search conditions each including a search key and a piece of applied mask information by analyzing the structure of the search request, searching the plurality of pieces of information to be searched according to each of the search conditions, and outputting a memory address uniquely associated with a detected piece of information to be searched; and a memory device for storing in advance a plurality of candidate search results and outputting a stored candidate search result associated with the memory address outputted from the content addressable/associative memory device as a search result.

In order to achieve the above second object, a content addressable/associative memory device having the function of searching stored information to be searched is provided. This content addressable/associative memory device comprises a data storage circuit for storing a plurality of pieces of information to be searched; an analysis circuit for generating, at the time of a search request including a plurality of search keys and a plurality of pieces of applied mask information each of which indicates an area to be searched by each of the plurality of search keys being inputted, a plurality of search conditions each including a search key and a piece of applied mask information by analyzing the structure of the search request; and a search circuit for searching the data storage circuit for a piece of information to be searched corresponding to each search condition generated by the analysis circuit, and for outputting a memory address uniquely associated with the detected piece of information to be searched.

In order to achieve the above third object, a content addressable/associative memory device use information search method for searching for information regarding a packet by using a content addressable/associative memory device is provided. This content addressable/associative memory device use information search method comprises the steps of outputting, by a network processor, a search request including a plurality of elements in the inputted packet treated as a plurality of search keys and a plurality of pieces of applied mask information each of which indicates an area to be searched by each of the plurality of search keys; analyzing the structure of the search request and generating a plurality of search conditions each including a search key and a piece of applied mask information; searching a plurality of pieces of information to be searched which are stored in advance in the content addressable/associative memory device for a piece of information to be searched corresponding to a search condition, and outputting a memory address uniquely associated with the piece of information to be searched corresponding to the search condition; and outputting a stored candidate search result associated with the memory address from a memory device in which a plurality of candidate search results are stored as a search result.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

An overview of the present invention applied to embodiments will be given first and then the concrete contents of the embodiments will be described.

Figure 1:
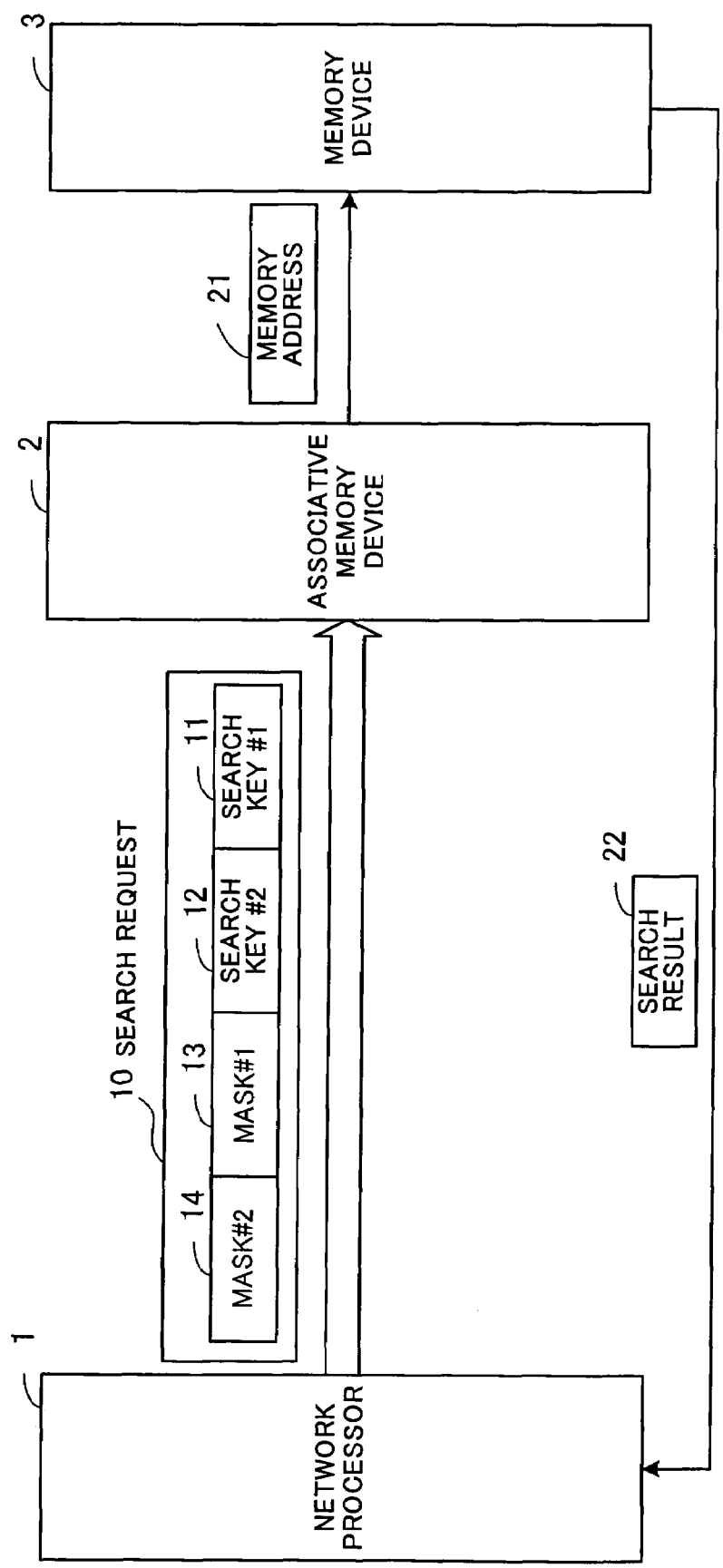
FIG. 1 is a schematic view of the present invention applied to embodiments.

FIG. 1 is a schematic view of the present invention applied to the embodiments. A data relay apparatus according to the present invention is used for relaying packets transmitted and comprises a network processor 1, a content addressable/associative memory device 2, and a memory device 3. The function of each component is as follows.

When a packet is inputted, the network processor 1 outputs a search request 10 including elements in the packet treated as search keys 11 and 12, respectively, and applied mask information 13 and 14 which indicate areas to be searched by the search keys 11 and 12, respectively. Elements in a packet treated as search keys are predefined in the network processor 1.

The content addressable/associative memory device 2 stores a plurality of pieces of information to be searched. The content addressable/associative memory device 2 accepts the search request 10 outputted from the network processor 1, analyzes the structure of the search request 10, and generates a plurality of search conditions from the search keys 11 and 12 and the applied mask information 13 and 14. For example, the content addressable/associative memory device 2 generates a search condition by combining the search key 11 and the applied mask information 13 and generates another search condition by combining the search key 12 and the applied mask information 14. The search conditions generated are stored in, for example, predetermined registers.

Then the content addressable/associative memory device 2 searches the plurality of pieces of information to be searched according to each search condition generated and outputs a memory address 21 uniquely associated with a detected piece of information to be searched to the memory device 3. To be concrete, the content addressable/associative memory device 2 does not search an area indicated by applied mask information included in a search condition but searches an area to be searched for a piece of information to be searched which matches a search key. Then the content addressable/associative memory device 2 outputs the memory address of an area where a detected piece of information to be searched is stored to the memory device 3.

The memory device 3 stores a plurality of candidate search results and outputs a stored candidate search result associated with the memory address 21 outputted from the content addressable/associative memory device 2 to the network processor 1 as a search result 22.

With the above-mentioned data relay apparatus, when a packet is inputted, the network processor 1 generates the search request 10 and passes it to the content addressable/associative memory device 2. Then the content addressable/associative memory device 2 analyzes the structure of the search request 10 and generates a plurality of search conditions. The content addressable/associative memory device 2 makes a search according to each search condition and outputs the memory address 21 corresponding to a detected piece of information to be searched to the memory device 3. The memory device 3 outputs a candidate search result corresponding to the memory address 21 to the network processor 1 as the search result 22.

As stated above, a plurality of search keys and a plurality of pieces of applied mask information are included in a search request. The content addressable/associative memory device 2 analyzes the structure of the search request 10 and generates a plurality of search conditions. Accordingly, even if a search must be made more than one time to transmit one packet, the plurality of search keys and the plurality of pieces of applied mask information can be accepted or passed at one time. As a result, a search request is accepted or passed efficiently and a search can be made efficiently.

Embodiments of the present invention will now be described concretely.

First Embodiment

Figure 2:
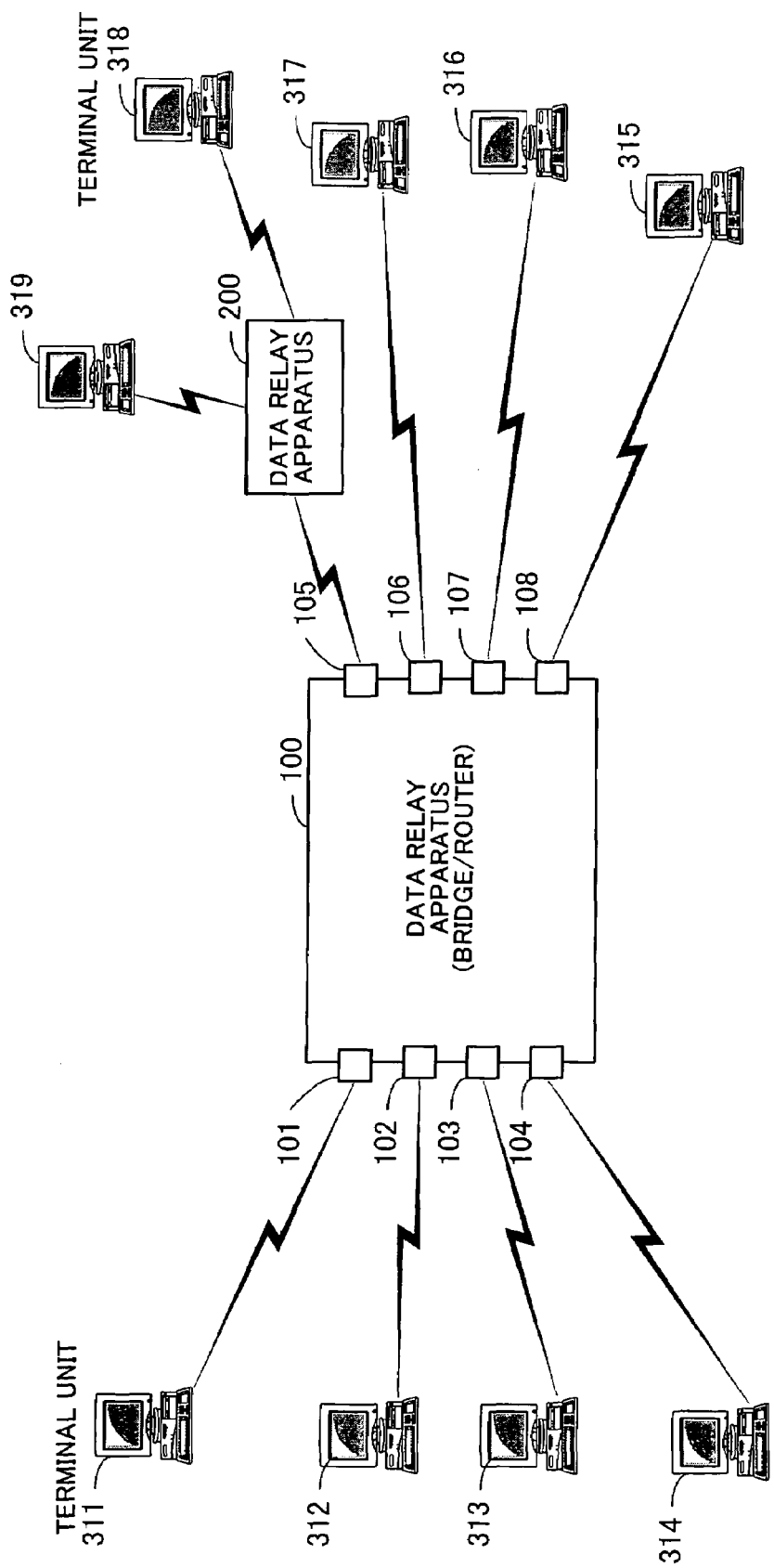
FIG. 2 shows an example of the configuration of a network system according to a first embodiment of the present invention.

FIG. 2 shows an example of the configuration of a network system according to a first embodiment of the present invention. A data relay apparatus 100 has physical ports 101 through 108. A network can be connected to each of the physical ports 101 through 108. Terminal units 311 through 317 and another data relay apparatus 200 are connected to the data relay apparatus 100 via networks. Terminal units 318 and 319 are connected to the data relay apparatus 200 in the same way.

Figure 3:
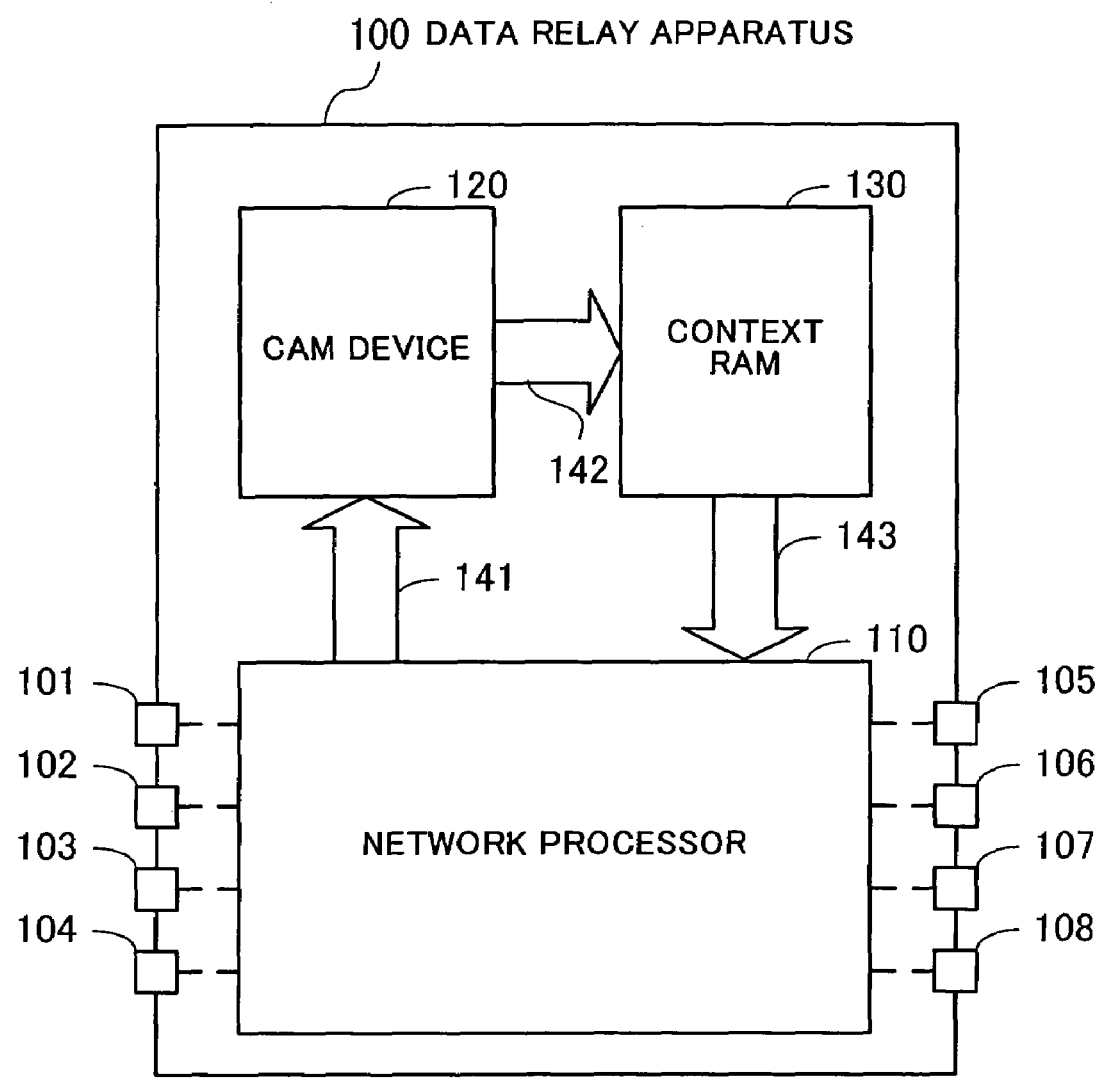
FIG. 3 is a block diagram showing the internal structure of a data relay apparatus.

FIG. 3 is a block diagram showing the internal structure of the data relay apparatus. The data relay apparatus 100 comprises a network processor 110, a CAM device 120, and a context RAM 130. The network processor 110 and the CAM device 120 are connected by a search data input bus 141. The CAM device 120 and the context RAM 130 are connected by an address bus 142 used for inputting an address to the context RAM 130. The context RAM 130 and the network processor 110 are connected by a data bus 143 used for outputting data from the context RAM 130. The network processor 110 is connected to the physical ports 101 through 108. Actually, the physical ports 101 through 108 are connected to the network processor 110 via communication interfaces or the like, but this is not shown in FIG. 3.

The network processor 110 interprets the contents of a packet inputted from each of the physical ports 101 through 108 and extracts an IP address and a port number therefrom. Then the network processor 110 outputs a search request to the CAM device 120 with the IP address and the port number as factors for determining a route and the contents (such as a transfer rate) of a service. In this case, the search request includes the factors for determination as search keys and includes mask setting commands according to the search keys. A search result is passed from the context RAM 130 in response to the search request. For example, the port number of a physical port to which the packet should be transmitted is passed. The network processor 110 determines a route via which the packet should be transmitted according to the search result and outputs it from the appropriate physical port.

The CAM device 120 stores the factors for determination, such as the IP addresses of terminal units and the like connected to the data relay apparatus 100 via networks and TCP/IP port numbers corresponding to applications and the like implemented on the terminal units for data communication, as information to be searched. The CAM device 120 searches the stored information to be searched in response to the search request outputted from the network processor 110. Then the CAM device 120 outputs the memory address of an area where detected information to be searched is stored to the context RAM 130.

The context RAM 130 stores candidate search results each of which maybe a search result corresponding to the search request outputted from the network processor 110. The candidate search results include information indicative of routes via which the packet is transmitted and information for designating the contents (such as transfer rates) of services provided for the packet. For example, the number of a physical port to which the packet should be sent and information for giving instructions to discard the packet are included. The candidate search results are associated with the factors for determination stored in the CAM device 120. To be concrete, the memory address of an area in the CAM device 120 where a factor for determination is stored corresponds to the memory address of an area in the context RAM 130 where a candidate search result corresponding to the factor for determination is stored.

When the memory address is inputted from the CAM device 120, the context RAM 130 passes a candidate search result stored at the memory address to the network processor 110 as a search result.

Figure 4:
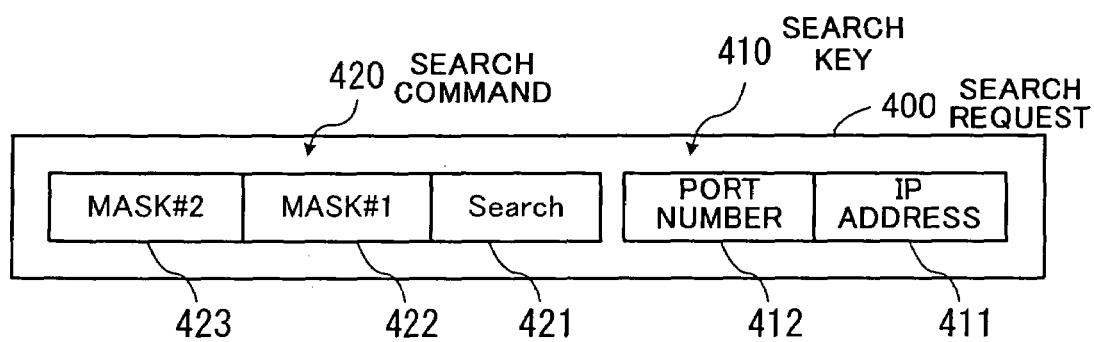
FIG. 4 shows an example of the data structure of a search request.

FIG. 4 shows an example of the data structure of a search request. A search request 400 includes a search key group 410 and a search command 420. The search key group 410 includes search keys 411 and 412 for determining a route and the contents of a service. For example, the search key 411 is an IP address and the search key 412 is a port number. The search command 420 includes an instruction statement 421 and applied mask information 422 and 423. Instructions to make a search are given to the CAM device 120 by the instruction statement 421. Information for designating masking at the time of making a search by using the search keys 411 and 412 is set as the applied mask information 422 and 423, respectively. In the first embodiment, an identification number defined in the CAM device 120 is used for designating the applied mask information 422 or 423.

Figure 5:
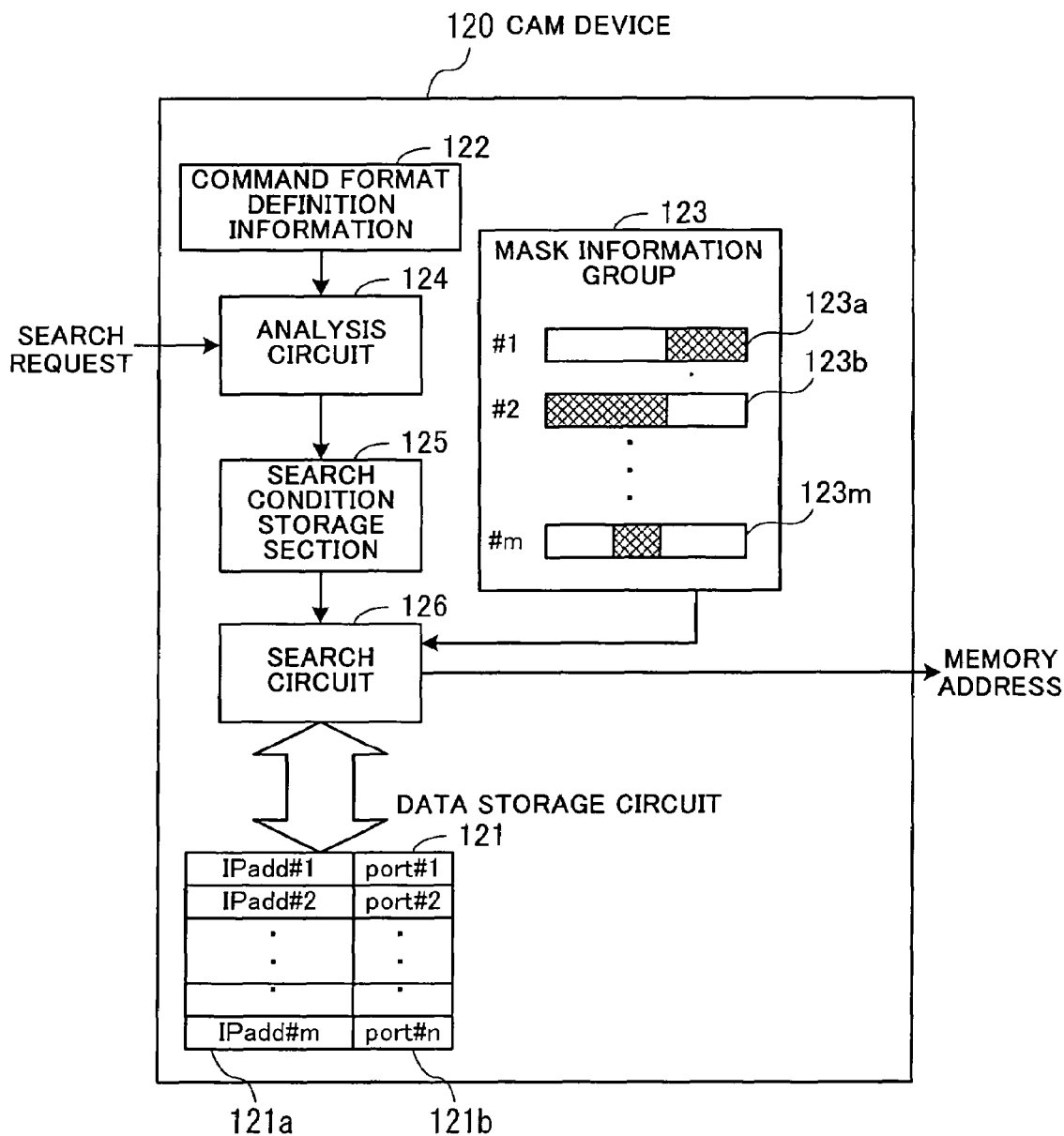
FIG. 5 is a block diagram showing the internal structure of a CAM device.

FIG. 5 is a block diagram showing the internal structure of the CAM device. As shown in FIG. 5, the CAM device 120 includes a data storage circuit 121, a command format definition information 122, a mask information group 123, an analysis circuit 124, a search condition storage section 125, and a search circuit 126.

The data storage circuit 121 is a circuit block (CAM cell array) for storing information, being factors for determining a route. These factors of different types are stored in different areas. In this example, the data storage circuit 121 includes an area 121a where IP addresses are stored and an area 121b where port numbers are stored.

The data format of the search request shown in FIG. 4 is defined in the command format definition information 122. For example, the following definition is given. In the search request 400, the first thirty-two bits are used for the first search key, the subsequent sixteen bits are used for the second search key, the subsequent sixteen bits are used for the instruction statement, the subsequent eight bits are used for the first applied mask information, and the subsequent eight bits are used for the second applied mask information.

The command format definition information 122 can be rewritten by a CPU that controls the entire data relay apparatus 100. The contents of the command format definition information 122 maybe included in a search request. In this case, the command format definition information 122 can be rewritten when the search request is received.

A plurality of pieces of mask information 123a, 123b, . . . , 123m for designating an area in the data storage circuit 121 which is excluded from an area to be searched are set in the mask information group 123. For example, "MASK #1" is mask information for masking an area other than the IP address storage area and "MASK #2" is mask information for masking an area other than the port number storage area. Identification numbers are set for the plurality of pieces of mask information 123a, 123b, . . . , 123m. Such an identification number is used for designating mask information to be provided at the time of making a search.

The analysis circuit 124 analyzes the structure of a search request and generates a plurality of search conditions each including a search key and apiece of applied mask information. To be concrete, when the analysis circuit 124 accepts a search request, the analysis circuit 124 extracts a plurality of search keys, an instruction statement, and a plurality of pieces of applied mask information in order from the search request in accordance with the contents of the command format definition information 122. Then the analysis circuit 124 stores combinations of a search key and a piece of applied mask information in the search condition storage section 125.

The search condition storage section 125 is a register group which can store the plurality of combinations of a search key and a piece of applied mask information.

The search circuit 126 retrieves in order the plurality of combinations of a search key and a piece of applied mask information stored in the search condition storage section 125 and searches the data storage circuit 121. To be concrete, the search circuit 126 refers to the mask information group 123 and extracts mask information corresponding to a piece of applied mask information retrieved from the search condition storage section 125. Then the search circuit 126 searches an area in the data storage circuit 121 other than an area designated by the mask information extracted for information which matches a search key. When information which matches the search key is detected, the search circuit 126 outputs the memory address of an area where the information is stored to the context RAM 130.

The following process is performed by the data relay apparatus 100 having the above-mentioned structure.

When a packet is inputted, the network processor 110 analyzes the contents of the packet and generates a search request including search keys, being factors for determining a route and the like, and pieces of applied mask information according to the search keys. Of information (including information included in the packet inputted and a situation in which the packet is received) regarding the packet inputted, information which should be treated as the factors for determining a route and the like is defined in advance in the network processor 110. In the following examples, an IP address and a port number are considered to be factors for determining a route. Pieces of applied mask information according to the factors for determination are also defined in advance in the network processor 110. A search is made in response to the search request.

Figure 6:
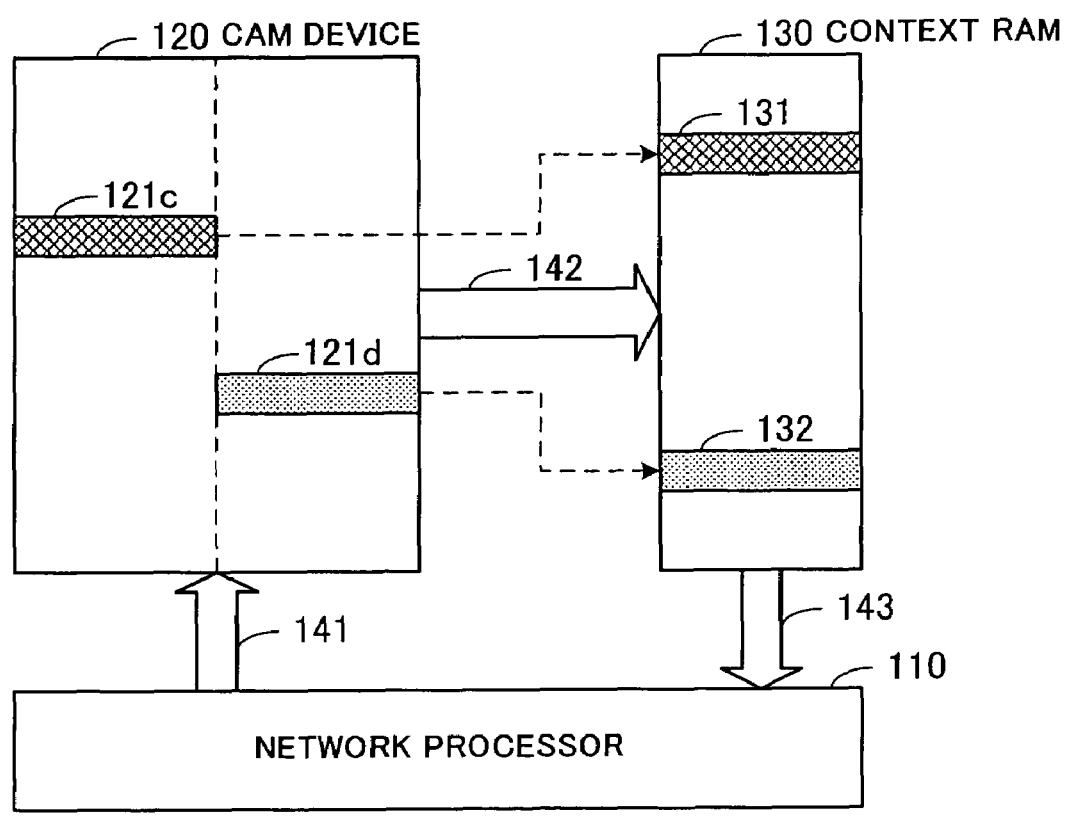
FIG. 6 is a schematic view of a search process.

FIG. 6 is a schematic view of a search process. The network processor 110 extracts an IP address and a port number from the predetermined positions of a header in a packet inputted and generates a search request. One search request is generated for each packet. The search request generated is inputted to the CAM device 120 via the search data input bus 141. The CAM device 120 performs a masking process on the data storage circuit 121 and retrieves the appropriate pieces of information 121c and 121d from entries in the data storage circuit 121. If the search request includes a plurality of search keys, then the appropriate piece of information is retrieved for each of the plurality of search keys.

The CAM device 120 inputs in order the memory addresses of areas where the appropriate pieces of information are stored to the context RAM 130 via the address bus 142. Then the context RAM 130 outputs pieces of information 131 and 132 stored in areas corresponding to the memory addresses inputted via the data bus 143. The pieces of information outputted via the data bus 143 are received by the network processor 110 as search results.

The network processor 110 determines how to handle the packet inputted (such as a physical port to which the packet is outputted and a transfer rate) according to the search results.

A process performed in the CAM device 120 will now be described in detail.

Figure 7:
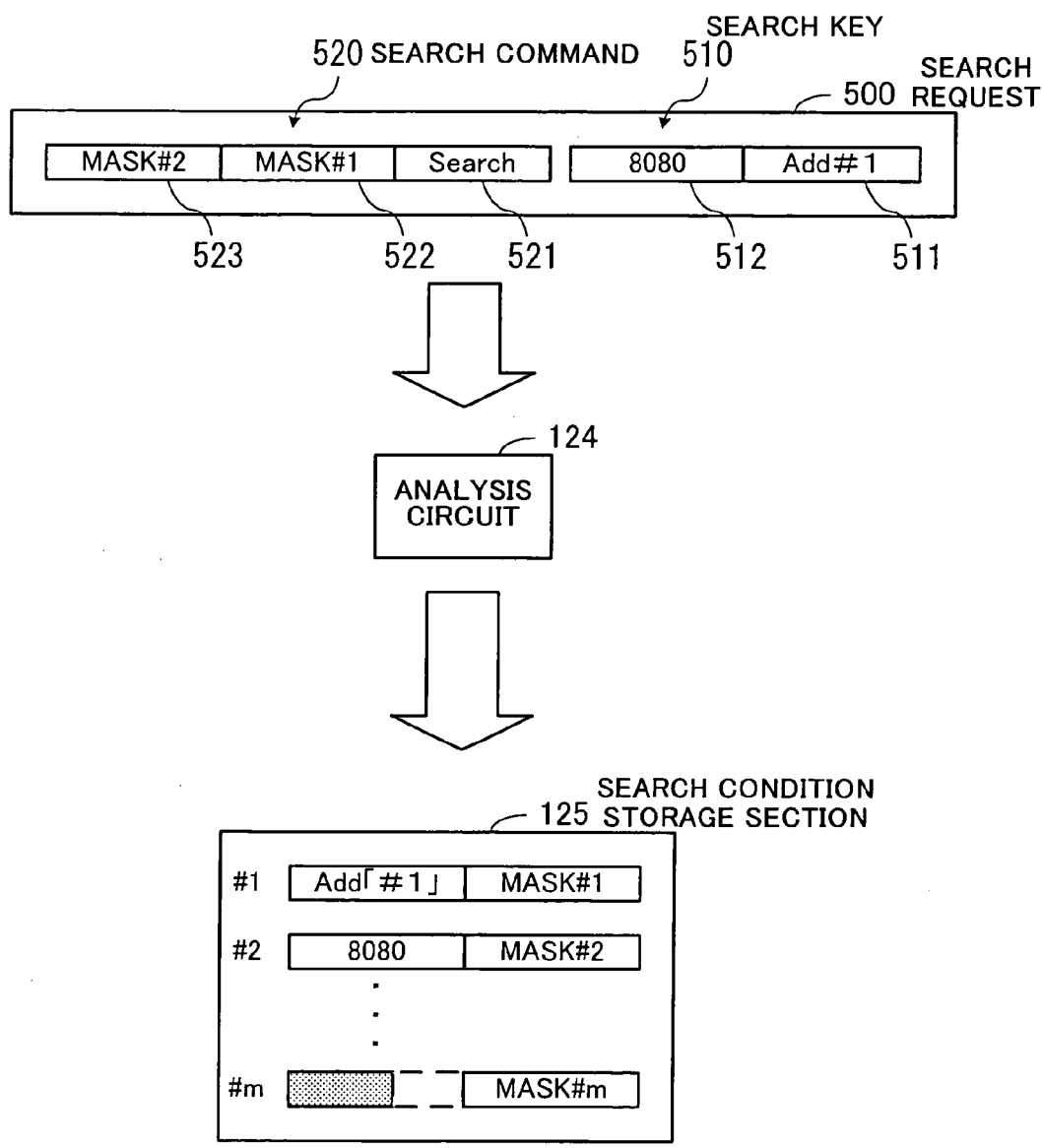
FIG. 7 shows a search request analysis process.

FIG. 7 shows a search request analysis process. In this example, the IP address "Add#1" and the port number "8080" are set as search keys 511 and 512, respectively, in a search key 510 in a search request 500. In a search command 520, "Search" is set as an instruction statement 521 and "MASK#1" and "MASK#2" are set as applied mask information 522 and 523. The applied mask information 522 indicates a mask applied to the search key 511 and the applied mask information 523 indicates a mask applied to the search key 512.

When the search request 500 including the above-mentioned information is inputted to the analysis circuit 124, the data structure of the search request 500 is analyzed in accordance with the command format definition information 122. Then the analysis circuit 124 stores a combination of the search key 511 and the applied mask information 522 in the search condition storage section 125 as a search condition. In addition, the analysis circuit 124 stores a combination of the search key 512 and the applied mask information 523 in the search condition storage section 125 as another search condition.

After the search conditions each including a search key and a piece of applied mask information are stored in the search condition storage section 125, the search circuit 126 retrieves them in order of storage. The search circuit 126 searches the data storage circuit 121 according to a search condition retrieved. In this example, the search circuit 126 first searches the data storage circuit 121 for the IP address "Add#1".

Figure 8:
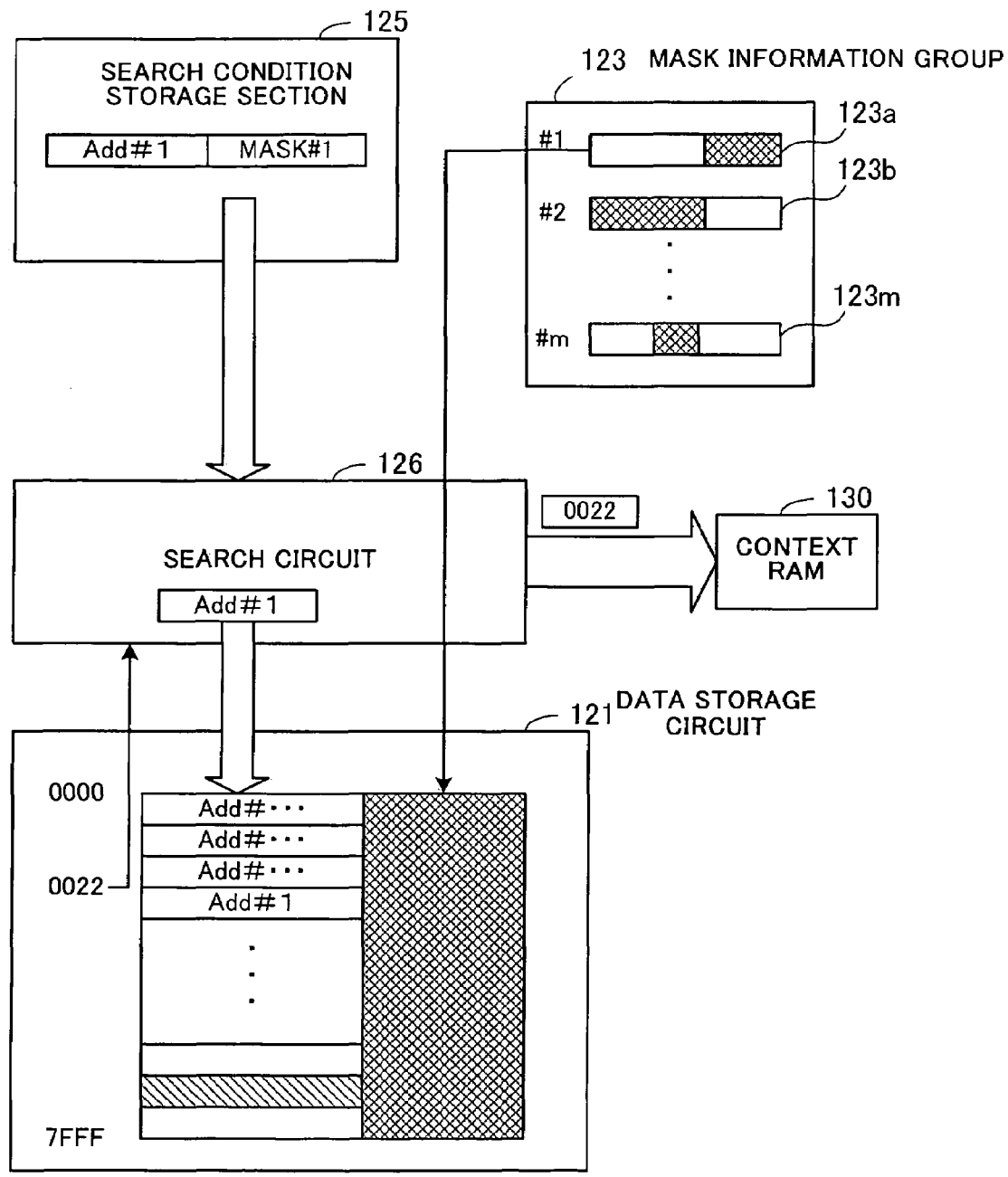
FIG. 8 shows an IP address search process.

FIG. 8 shows an IP address search process. As shown in FIG. 8, the search circuit 126 extracts the search condition which was stored first in the search condition storage section 125, and thus obtains the search key 511 and the applied mask information 522. The search circuit 126 extracts the mask information 123a corresponding to "MASK#1" set as the applied mask information 522 from the mask information group 123 and determines an area in the data storage circuit 121 to be masked (area in the data storage circuit 121 excluded from an area to be searched). In this example, the area 121a where IP addresses are stored is to be searched and the area 121b where port numbers are stored is excluded from the area to be searched.

Then the search circuit 126 searches the area 121a for data which matches the search key 511. The search circuit 126 obtains the memory address of an area where the data which matches the search key 511 is stored, and outputs it to the context RAM 130. Then the context RAM 130 sends a candidate search result stored in an area corresponding to the memory address inputted to the network processor 110 as a search result. As a result, the search process in the Layer 3 is completed.

After the process of searching for the IP address "Add#1" is completed, the search circuit 126 makes a search on the basis of a combination of a search key and applied mask information which was stored second in the search condition storage section 125. In this example, the search circuit 126 searches for the port number "8080".

Figure 9:
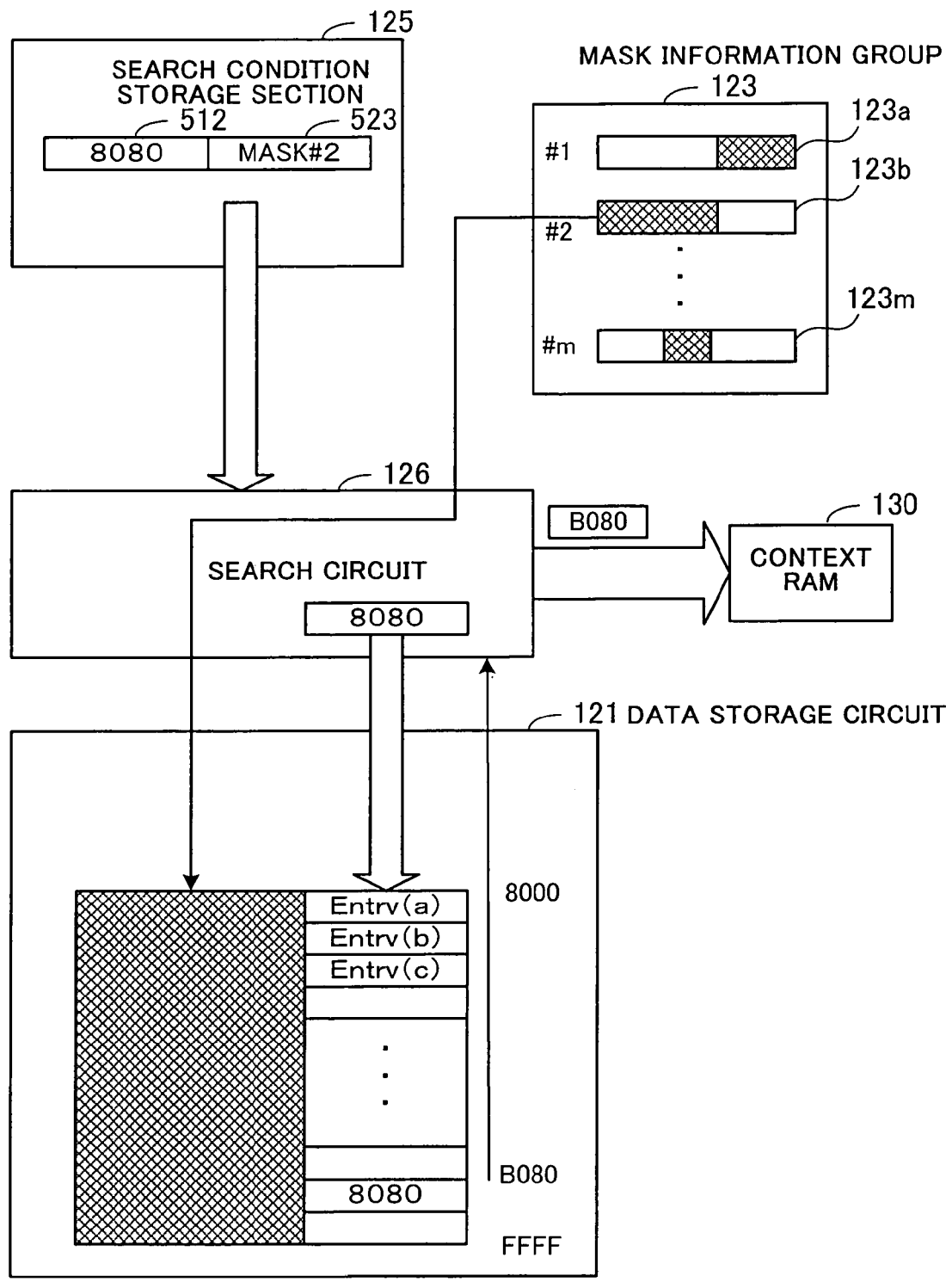
FIG. 9 shows a port number search process.

FIG. 9 shows a port number search process. As shown in FIG. 9, the search circuit 126 extracts the information which was stored second in the search condition storage section 125, and thus obtains the search key 512 and the applied mask information 523. The search circuit 126 extracts the mask information 123b corresponding to "MASK#2" set as the applied mask information 523 from the mask information group 123 and determines an area in the data storage circuit 121 to be masked (area in the data storage circuit 121 excluded from an area to be searched). In this example, the area 121b where port numbers are stored is to be searched and the area 121a where IP addresses are stored is excluded from the area to be searched.

Then the search circuit 126 searches the area 121b for data which matches the search key 512. The search circuit 126 obtains the memory address of an area where the data which matches the search key 512 is stored, and outputs it to the context RAM 130. Then the context RAM 130 sends a candidate search result stored in an area corresponding to the memory address inputted to the network processor 110 as a search result. As a result, the search process in the Layer 4 is completed.

A processing procedure performed by the network processor for providing an additional service according to the contents of a packet inputted and the contents of a contract between the sender of the packet and the manager of the data relay apparatus will now be described.

Figure 10:
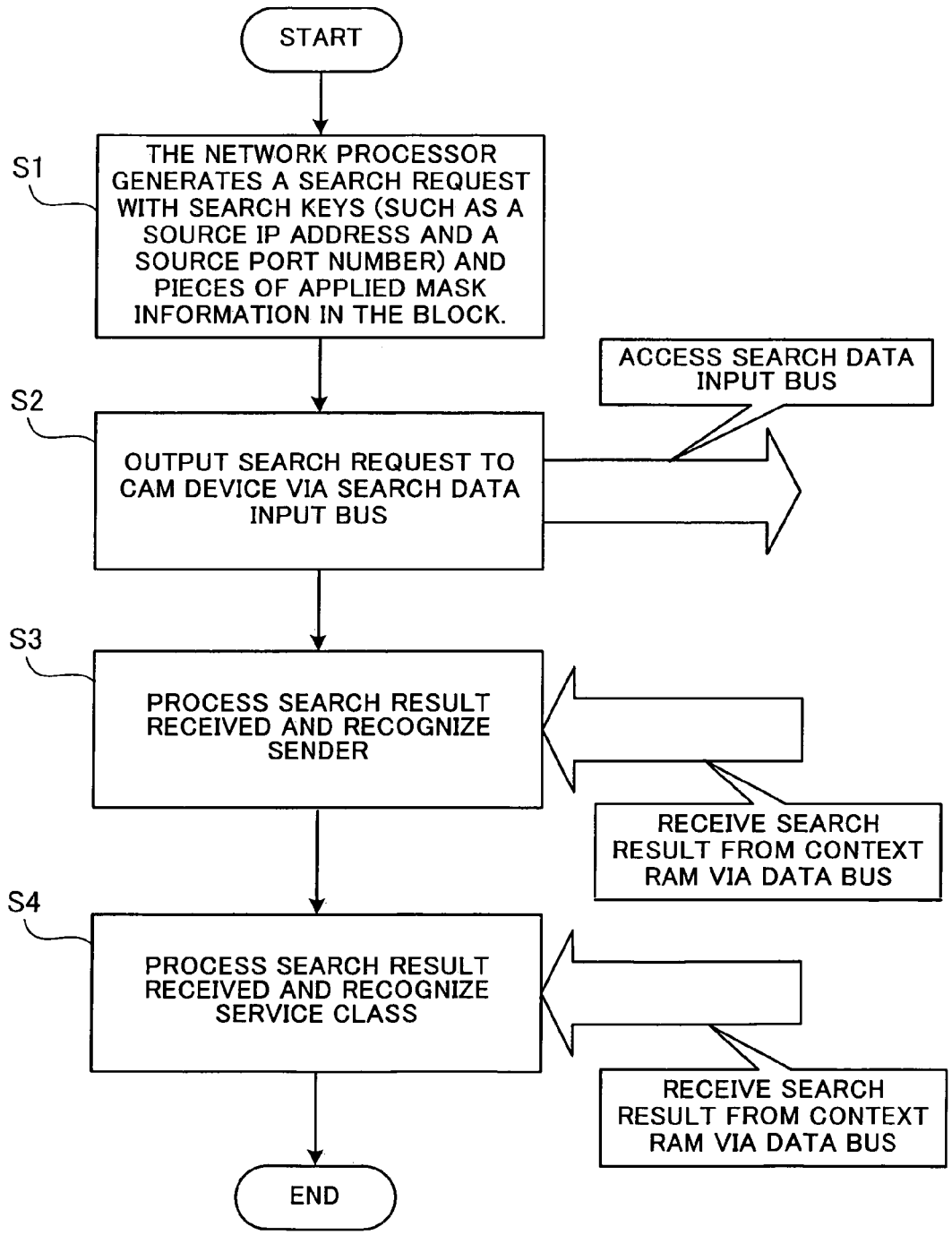
FIG. 10 is a sequence diagram showing a service content determination process performed by the network processor in the first embodiment.

FIG. 10 is a sequence diagram showing a service content determination process performed by the network processor in the first embodiment. The process shown in FIG. 10 will now be described in order of step number.

[Step S1] When the network processor 110 receives a packet, the network processor 110 generates a search request with search keys, such as a source IP address and a source port number, and pieces of applied mask information according to the search keys in the block.

[Step S2] The network processor 110 outputs the search request it generates to the search data input bus 141. As a result, the CAM device 120 makes a search according to each of the search keys.

[Step S3] The network processor 110 receives a search result obtained by using the IP address as a search key from the context RAM 130 via the data bus 143. Then the network processor 110 processes the search result it receives and recognizes the sender (subscriber) of the packet.

[Step S4] The network processor 110 receives a search result obtained by using the port number as a search key from the context RAM 130 via the data bus 143. Then the network processor 110 processes the search result it receives and recognizes a service class.

As stated above, the network processor 110 always generates only one search request for each packet to be transmitted. As a result, a search request can be sent efficiently via the search data input bus 141. In addition, in a search request an applied mask can be designated for each search key. Accordingly, an area in the CAM device 120 to be searched can be limited, resulting in improvement in the efficiency of a search.

Second Embodiment

In the second embodiment, search results obtained on the basis of one search request are collected and are returned to a network processor. That is to say, in the first embodiment, if a search request includes a plurality of search keys, the number of times a search is made is the same as that of the search keys. Each time a search is made, a search result is outputted from a context RAM. In this case, the network process or receives a plurality of search results for one search request. Therefore, the network processor must determine the relationship between them. On the other hand, in the second embodiment, a plurality of search results are collected by a CAM device and then are sent to the network processor. As a result, a process performed by the network processor is simplified and the process of transmitting a packet can be performed at a higher speed.

Figure 11:
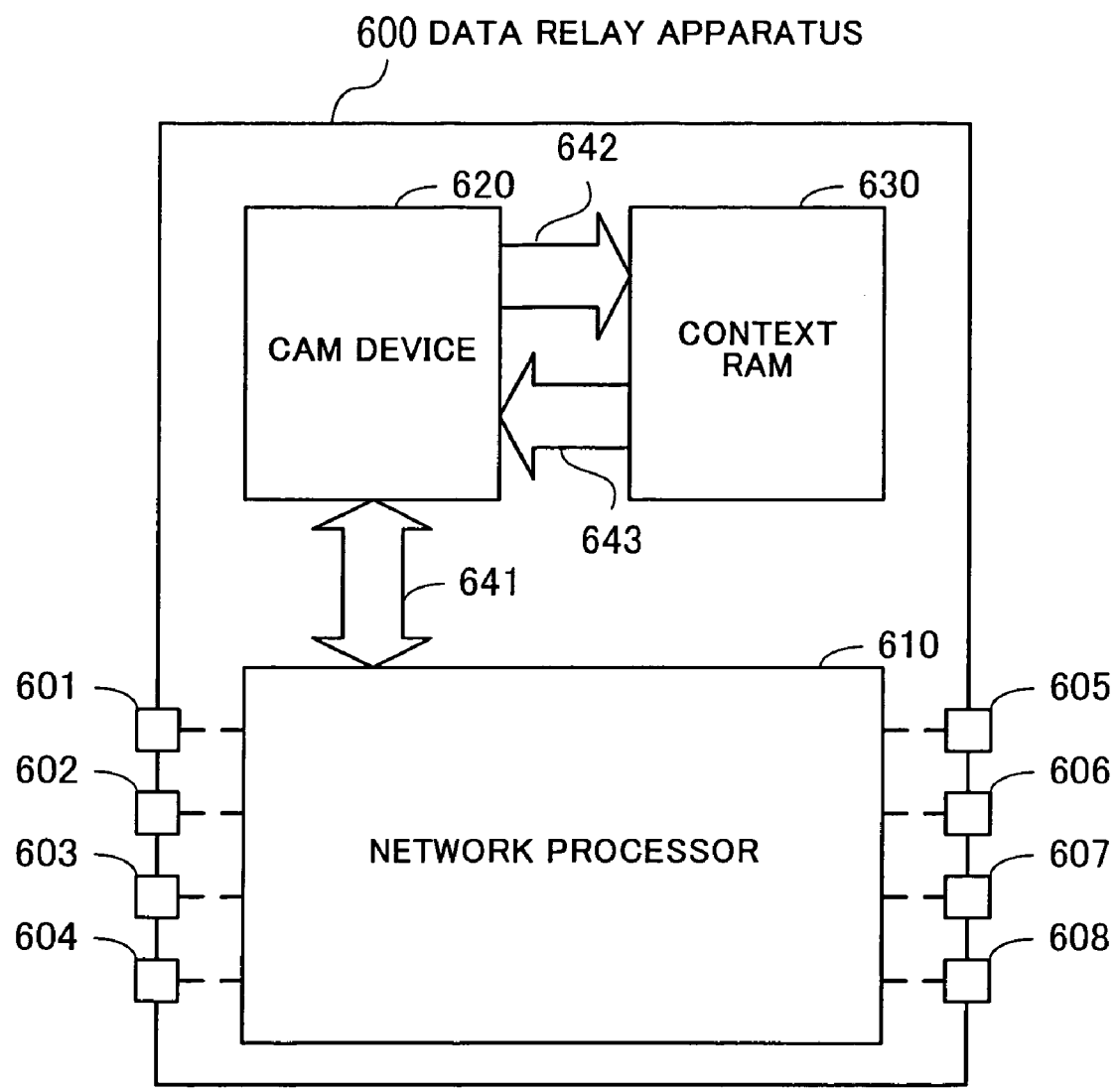
FIG. 11 shows an example of the structure of a data relay apparatus according to a second embodiment of the present invention.

FIG. 11 shows an example of the structure of a data relay apparatus according to a second embodiment of the present invention. A data relay apparatus 600 comprises physical ports 601 through 608, a network processor 610, a CAM device 620, and a context RAM 630.

The physical ports 601 through 608 are connected to the network processor 610. The network processor 610 and the CAM device 620 are connected by an input-output bus 641. The CAM device 620 and the context RAM 630 are connected by an address bus 642 and a data bus 643.

The network processor 610 sends a search request for the routing of a packet inputted from each physical port to the CAM device 620. It is assumed that this search request includes a plurality of search keys.

The CAM device 620 makes a search according to each search key. The CAM device 620 inputs a memory address obtained by making a search according to each search key to the context RAM 630 via the address bus 642. Then the context RAM 630 outputs data corresponding to the memory address inputted to the data bus 643.

The context RAM 630 outputs data more than one time. That is to say, the context RAM 630 outputs a plurality of search results. The plurality of search results are returned to the CAM device 620 and are stored in, for example, different registers. After all of the plurality of the search results corresponding to the search request are stored in registers, the CAM device 620 passes all of the plurality of the search results to the network processor 610 as a search result set.

To perform such a process, the CAM device 620 must include registers for storing search results.

Figure 12:
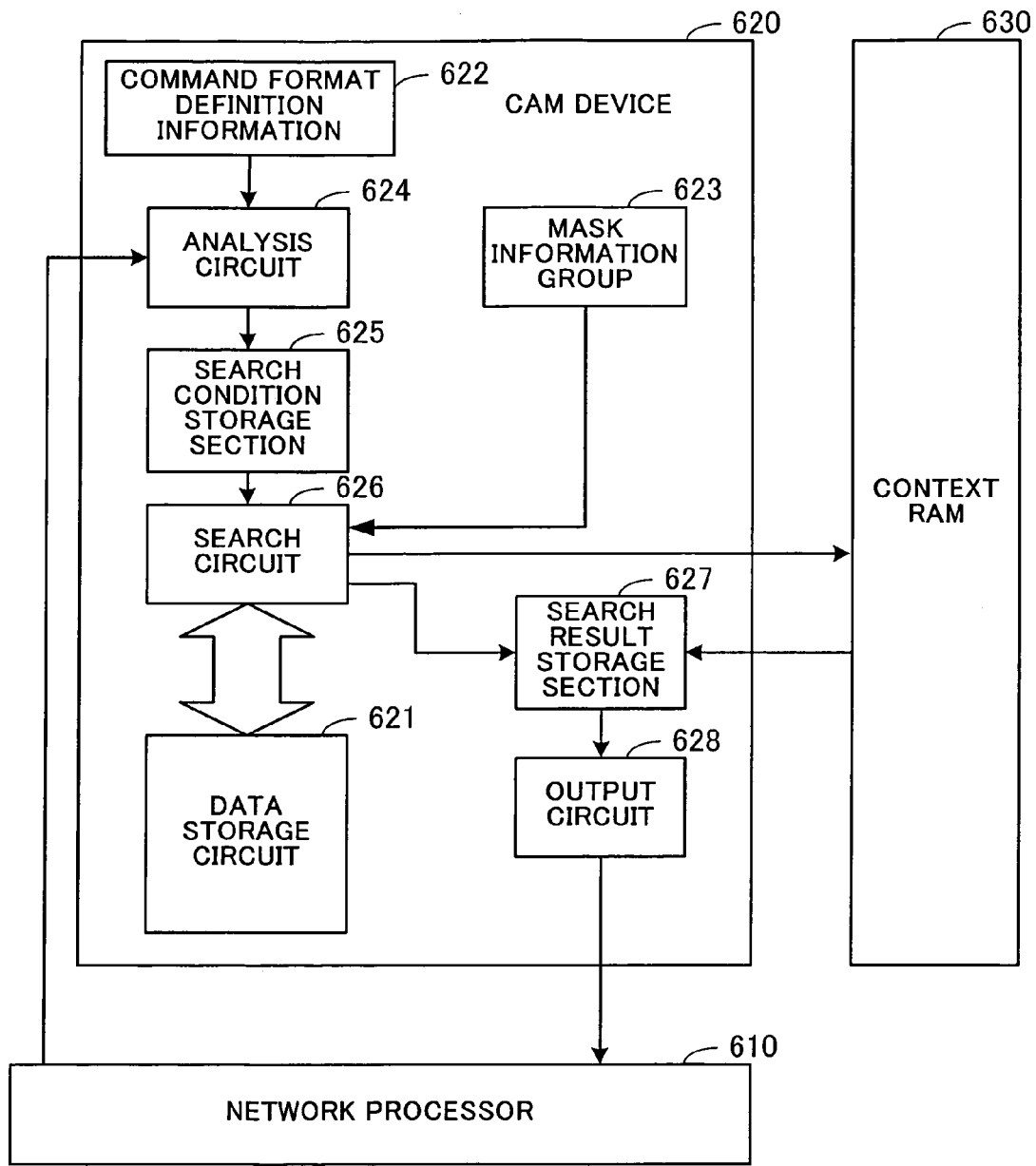
FIG. 12 shows the structure of a CAM device in the second embodiment.

FIG. 12 shows the structure of the CAM device in the second embodiment. As shown in FIG. 12, the CAM device 620 includes a data storage circuit 621, command format definition information 622, a mask information group 623, an analysis circuit 624, a search condition storage section 625, a search circuit 626, a search result storage section 627, and an output circuit 628. Each component shown in FIG. 12 has not only the same function that is performed by a component of the same name in the first embodiment shown in FIG. 5 but also the following function.

The analysis circuit 624 has not only the same function that is performed by the analysis circuit 124 in the first embodiment shown in FIG. 5 but also the function of adding information for identifying a search request and the number of search keys included in the search request to a search condition. For example, the analysis circuit 624 generates a search condition on the basis of a search key, applied mask information, the identification number of a search request inputted, and information indicative of the number of search keys included in the search request and stores it in a register in the search condition storage section 625.

Each register in the search condition storage section 625 has sufficient capacity to store a search key, applied mask information, information for identifying a search request and the number of search keys included in the search request.

The search circuit 626 sends a memory address obtained by searching the data storage circuit 621 to the context RAM 630 and stores information for identifying the search request and the number of search keys included in the search request added to the search condition in a register in the search result storage section 627. A search result outputted from the context RAM 630 is also stored in this register. As a result, the search result outputted from the context RAM 630 is associated with the information for identifying the search request and the number of search keys included in the search request.

The search result storage section 627 includes a plurality of registers for storing information for identifying a search request, the number of search keys included in the search request, and a search result outputted from the context RAM 630.

The output circuit 628 refers to information stored in the search result storage section 627. When the number of search results corresponding to a search request is equal to that of search keys included in the search request, the output circuit 628 collects these search results and passes them to the network processor 610.

Figure 13:
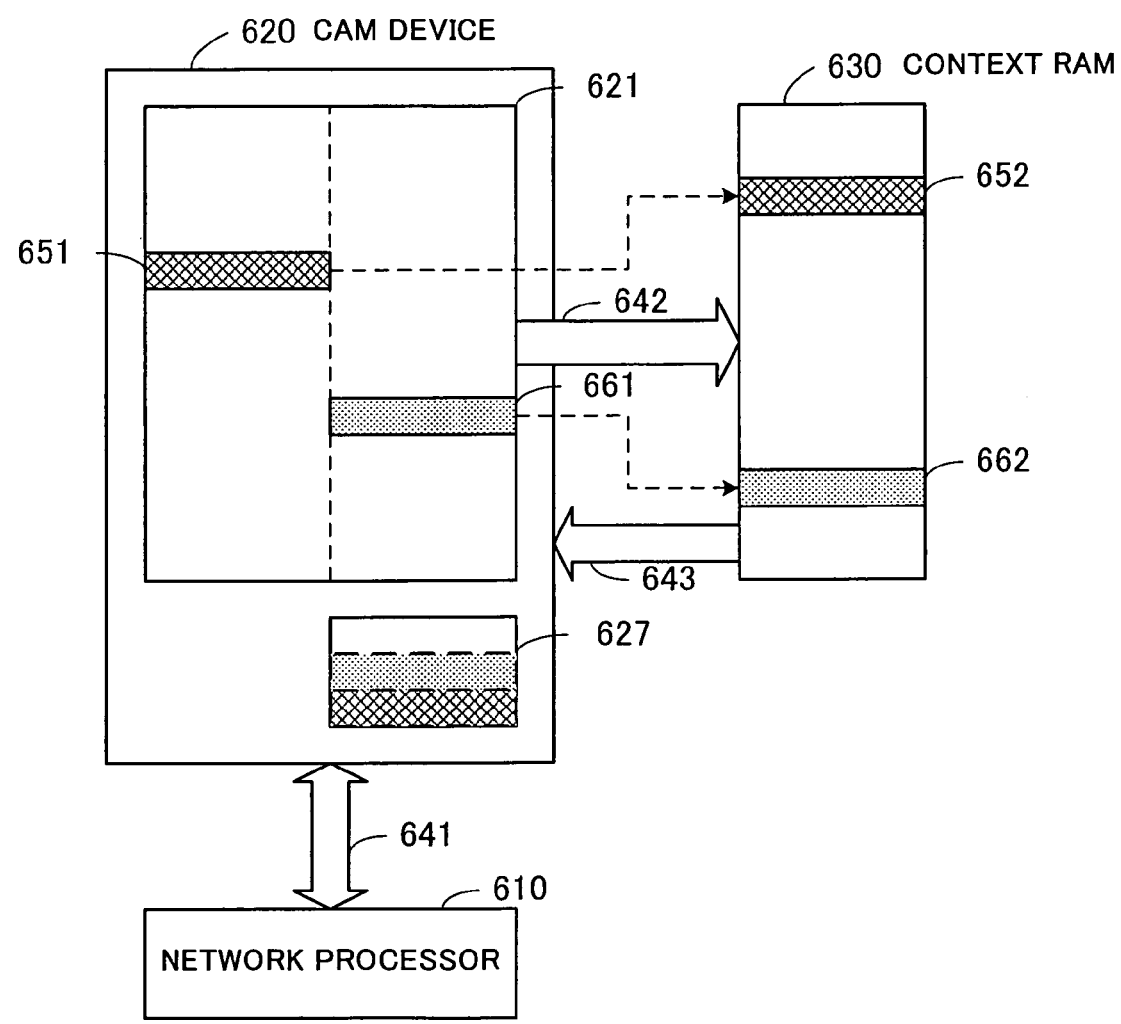
FIG. 13 shows a search process in the second embodiment.

FIG. 13 shows a search process in the second embodiment. For example, in a first search, there is a hit on an entry 651 and its memory address is inputted to the context RAM 630 via the address bus 642. Then information 652 corresponding to the memory address inputted is passed to the CAM device 620 via the data bus 643 as a search result. The CAM device 620 temporarily stores the information 652 sent as a search result in a register in the search result storage section 627.

In a second search, there is a hit on an entry 661 and its memory address is inputted to the context RAM 630 via the address bus 642. Then information 662 corresponding to the memory address inputted is passed to the CAM device 620 via the data bus 643 as a search result. The CAM device 620 temporarily stores the information 662 sent as a search result in a register in the search result storage section 627.

As a result, a total of two search results are stored. If only two search keys are included in the search request, then the number (two) of the search results corresponding to the search request is equal to that of the search keys included in the search request. Therefore, these search results are integrated and sent to the network processor 610 via the input-output bus 641.

A processing procedure performed by the network processor for providing an additional service according to the contents of a packet inputted and the contents of a contract between the sender of the packet and the manager of the data relay apparatus will now be described.

Figure 14:
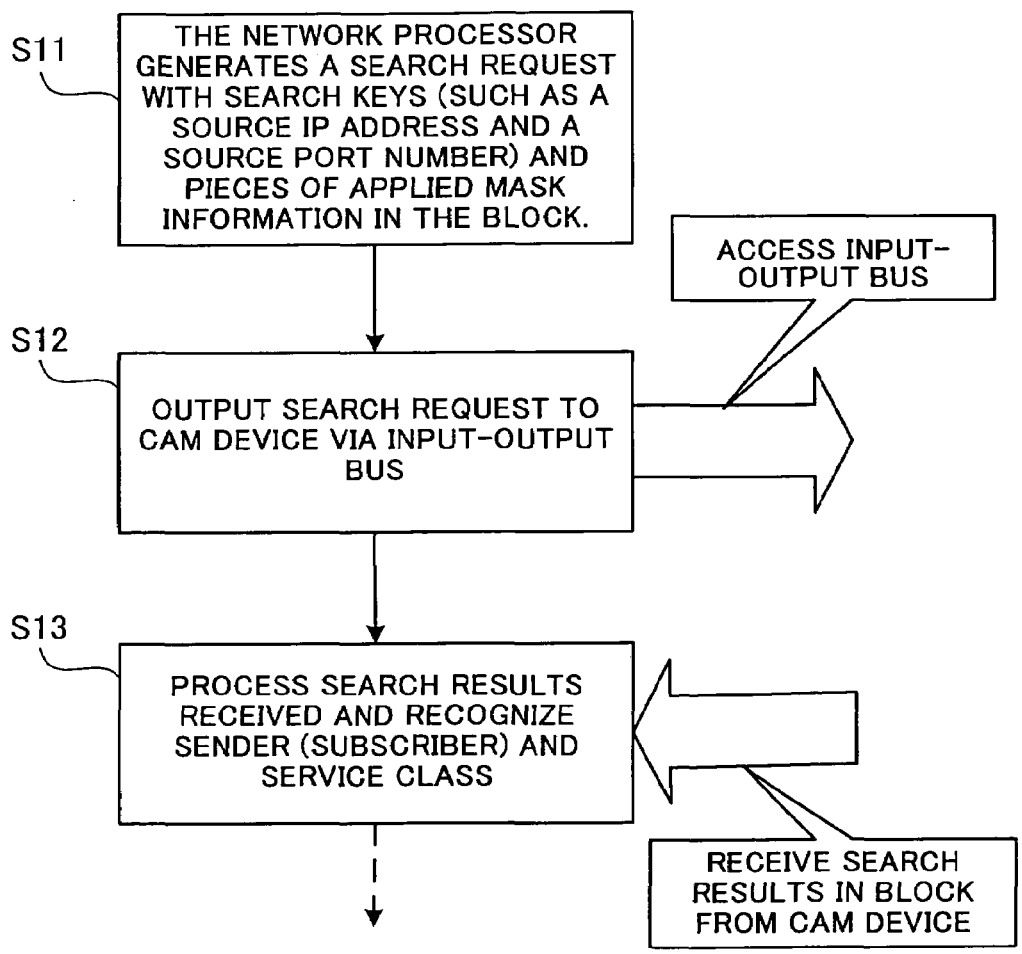
FIG. 14 is a sequence diagram showing a service content determination process performed by a network processor in the second embodiment.

FIG. 14 is a sequence diagram showing a service content determination process performed by the network processor in the second embodiment. The process shown in FIG. 14 will now be described in order of step number.

[Step S11] When the network processor 610 receives a packet, the network processor 110 generates a search request with search keys, such as a source IP address and a source port number, and pieces of applied mask information according to the search keys in the block.

[Step S12] The network processor 610 outputs the search request it generates to the input-output bus 641. As a result, the CAM device 620 makes a search according to each of the search keys. The CAM device 620 collects a plurality of search results.

[Step S13] The network processor 610 receives a search result obtained by using the IP address as a search key and a search result obtained by using the port number as a search key from the input-output bus 641. Then the network processor 610 processes the search results it receives and recognizes the sender (subscriber) of the packet and a service class.

As stated above, search results can be returned at one time in response to one search request outputted from the network processor. As a result, the network processor 610 need not perform the process of collecting the search results.

That is to say, in a CAM device, usually time taken to search entries differs according to the width of search bits. This may lead to a shift in timing at which an address is issued to a context RAM. In the second embodiment, the network processor can receive a plurality of search results in the block. Therefore, there is no need to determine the relationship between the plurality of search results with a difference in necessary time between searches in the CAM device, that is to say, timing at which the results are outputted from the context RAM taken into consideration.

Third Embodiment

In a third embodiment, the present invention is applied to a data relay apparatus including a plurality of network processors.

Figure 15:
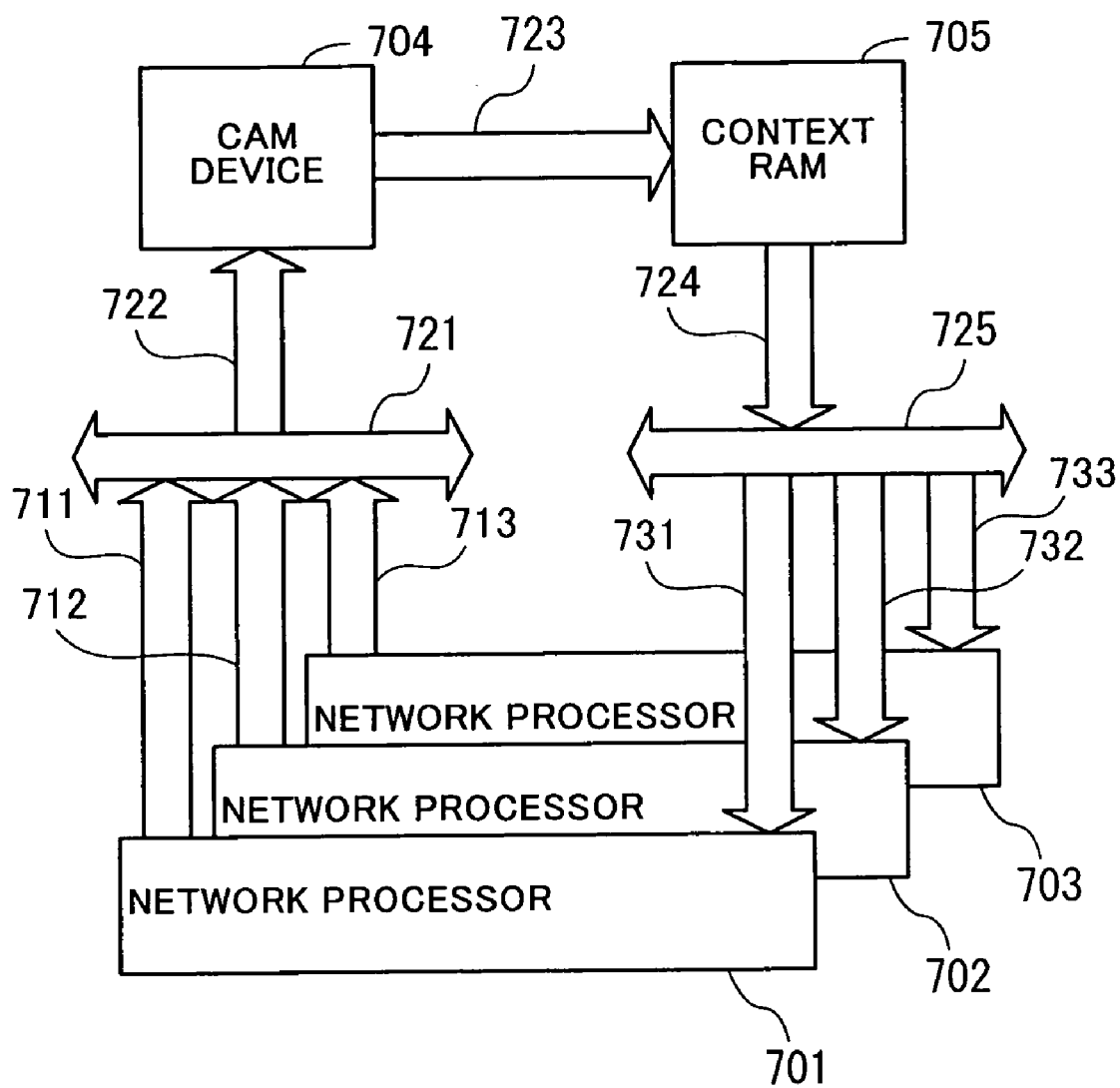
FIG. 15 shows an example of the structure of a data relay apparatus according to a third embodiment of the present invention.

FIG. 15 shows an example of the structure of a data relay apparatus according to the third embodiment of the present invention. As shown in FIG. 15, a data relay apparatus according to the third embodiment of the present invention comprises network processors 701, 702, and 703, a CAM device 704, and a context RAM 705.

The network processor 701 is connected to a CAM bus 721 via an output interface 711. The network processor 702 is connected to the CAM bus 721 via an output interface 712. The network processor 703 is connected to the CAM bus 721 via an output interface 713. The CAM bus 721 is connected to the CAM device 704 via an input interface 722. The CAM bus 721 has the function of intervening among a plurality of data transmission requests (process for making each network processor a bus master capable of occupying buses).

The CAM device 704 is connected to the context RAM 705 via an output interface (address bus of the context RAM 705) 723. The context RAM 705 is connected to a context RAM bus 725 via an output interface (data bus of the context RAM 705) 724. The context RAM bus 725 is connected to the network processor 701 via an input interface 731. The context RAM bus 725 is connected to the network processor 702 via an input interface 732. The context RAM bus 725 is connected to the network processor 703 via an input interface 733.

Each of the network processors 701, 702, and 703 issues a search request including a search key, a piece of applied mask information, and a search command from the output interfaces 711, 712, and 713, respectively, to the CAM device 704. The CAM bus 721 intervenes among these search requests and they are inputted to the CAM device 704. Then the CAM device 704 makes a search. Information at which there is a hit or a mishit in the search process is inputted to the context RAM 705 as a read address. In this case, a search may be made more than one time.

The context RAM 705 outputs data, or a search result, stored at a corresponding address from the output interface 724 and passes it to the network processor which issued the search request.

As stated above, by applying the present invention to the data relay apparatus having the network processors 701 through 703, only one search request is made for each frame transmitted by each of the network processors 701 through 703. This reduces the load on the CAM bus 721 caused by an intervention process. As a result, a search request can be passed or received smoothly.

Fourth Embodiment

In a fourth embodiment, a CAM device having the function of collecting search results is included in a data relay apparatus having a plurality of network processors.

Figure 16:
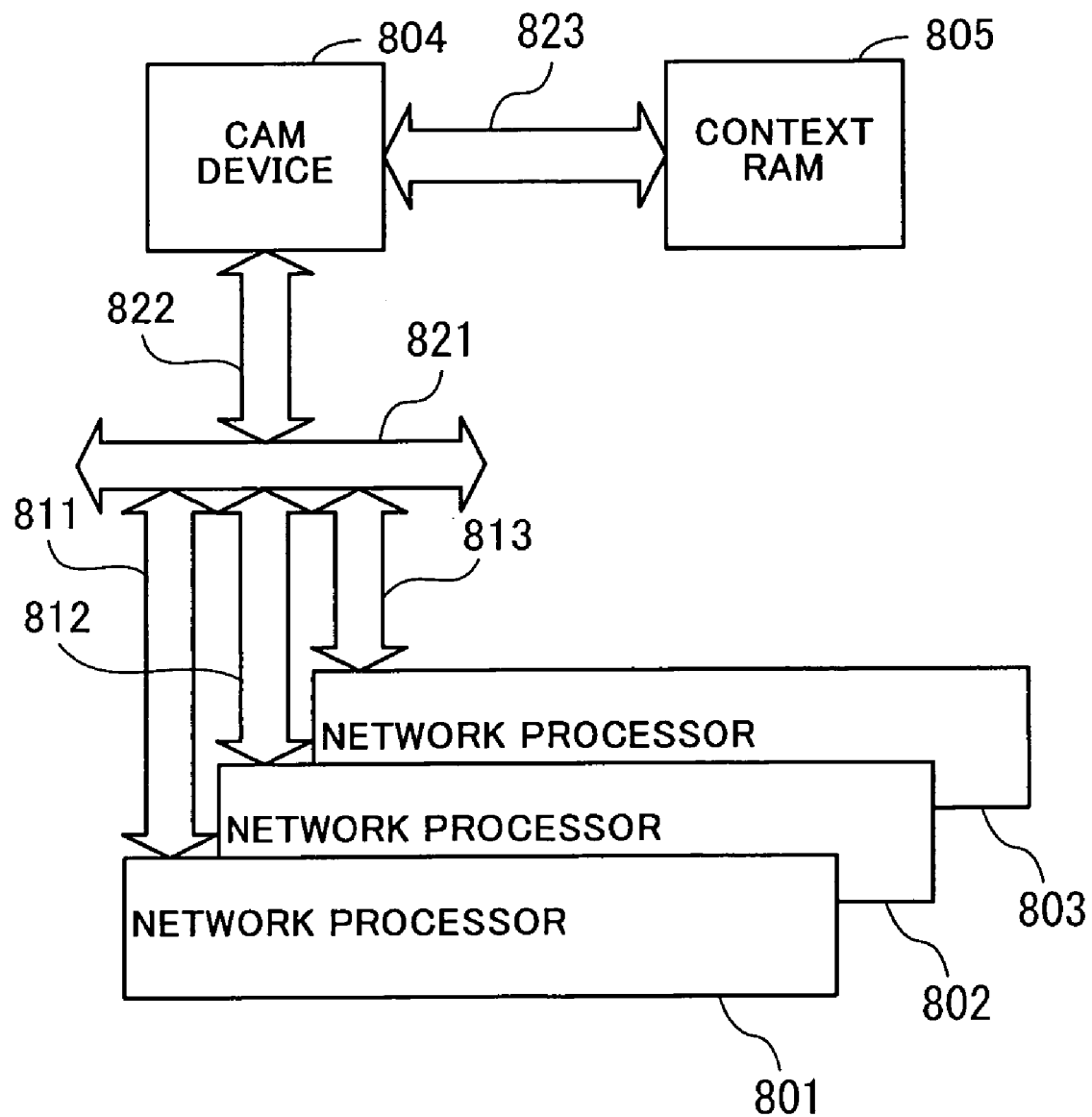
FIG. 16 shows an example of the structure of a data relay apparatus according to a fourth embodiment of the present invention.
Figure 17:
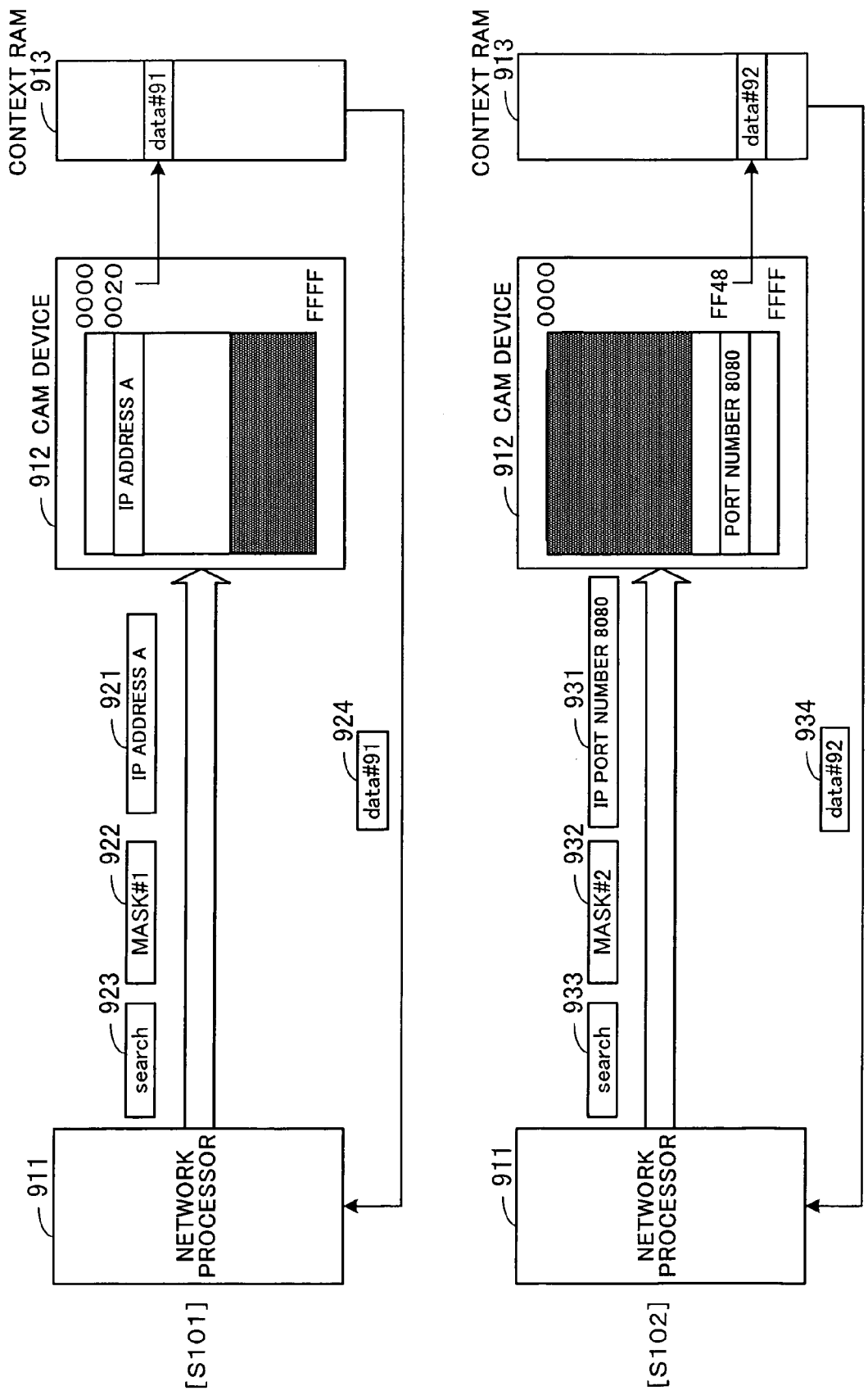
FIG. 17 shows a conventional route search process involving accessing a CAM device more than one time.

FIG. 16 shows an example of the structure of a data relay apparatus according to the fourth embodiment of the present invention. As shown in FIG. 16, a data relay apparatus according to the fourth embodiment of the present invention comprises network processors 801, 802, and 803, a CAM device 804, and a context RAM 805.

The network processor 801 is connected to a CAM bus 821 via an input-output interface 811. The network processor 802 is connected to the CAM bus 821 via an input-output interface 812. The network processor 803 is connected to the CAM bus 821 via an input-output interface 813. The CAM bus 821 is connected to the CAM device 804 via an input-output interface 822. The CAM bus 821 has the function of intervening among a plurality of data transmission requests (process for making each network processor a bus master capable of occupying buses). The CAM device 804 is connected to the context RAM 805 via an input-output interface 823 (including an address bus and a data bus).

The internal structure of the CAM device 804 is the same as that of the CAM device 620 in the second embodiment shown in FIG. 12.

In the data relay apparatus having the above-mentioned structure, each of the network processors 801, 802, and 803 issues a search request including a search key, a piece of mask information, and a search command from the input-output interfaces 811, 812, and 813, respectively. The CAM bus 821 intervenes among these search requests and they are passed to the CAM device 804 via the input-output interface 822. The CAM device 804 makes a search in response to each search request. Information at which there is a hit or a mishit in the search process performed by the CAM device 804 is inputted to the context RAM 805 via the input-output interface 823 as an address. Then the context RAM 805 outputs data, or a search result, stored at a corresponding address to the CAM device 804 via the input-output interface 823.

If one search request includes a plurality of search keys, then the CAM device 804 holds a search result it obtains until search results corresponding to all of the plurality of search keys are obtained. When all of the search results corresponding to the same search request are obtained, the CAM device 804 collects these search results and returns them to a network processor which issued the search request.

In each of the above-mentioned embodiments, only one CAM device and only one context RAM are shown in the data relay apparatus. However, each of the CAM device and the context RAM may not be located on one chip. That is to say, if memory space is required, each of the CAM device and the context RAM may be located on a plurality of chips. In this case, the plurality of chips realize the function of the CAM device or the context RAM in each of the above-mentioned embodiments all in one. Each chip does not perform a process individually.

As has been described in the foregoing, in the present invention a plurality of search keys and a plurality of pieces of applied mask information are outputted as one search request, the search request is analyzed by a content addressable/associative memory device, and search conditions each including a search key and a piece of applied mask information are generated. Therefore, even if the content addressable/associative memory device must make a search more than one time for one packet transmitted, the search request is transmitted only once. As a result, search keys are passed or received efficiently and a search process can be performed more efficiently.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data relay apparatus for relaying a packet transmitted, the apparatus comprising:
   a network processor for outputting, at the time of the packet being inputted, a search request including a plurality of elements in the packet treated as a plurality of search keys and a plurality of pieces of applied mask information each of which indicates an area to be searched by each of the plurality of search keys;
   a content addressable/associative memory device for storing in advance a plurality of pieces of information to be searched, accepting the search request outputted from the network processor, generating a plurality of search conditions each including a search key and a of piece of applied mask information by analyzing the structure of the search request, searching the plurality of pieces of information to be searched according to each of the search conditions, and outputting a memory address uniquely associated with a detected piece of information to be searched; and
   a memory device for storing in advance a plurality of candidate search results and outputting a stored candidate search result associated with the memory address outputted from the content addressable/associative memory device as a search result.

2. The data relay apparatus according to claim 1, wherein the memory device outputs the candidate search result stored in a data storage area corresponding to the memory address to the network processor as a search result.

3. The data relay apparatus according to claim 1, wherein the memory device outputs the candidate search result stored in a data storage area corresponding to the memory address to the content addressable/associative memory device as a search result.

4. The data relay apparatus according to claim 3, wherein the content addressable/associative memory device stores the search result returned according to the memory address outputted in a buffer and outputs search results according to the plurality of search keys included in the search request to the network processor in the block.

5. The data relay apparatus according to claim 1, wherein:
   a plurality of network processors are included; and
   search requests are outputted from the plurality of network processors via a common bus that intervenes among the search requests.

6. The data relay apparatus according to claim 1, wherein the content addressable/associative memory device searches a storage area to be searched for a piece of information to be searched which matches each search key with a storage area designated by each piece of applied mask information as a storage area not to be searched.

7. The data relay apparatus according to claim 6, wherein the content addressable/associative memory device stores in advance a plurality of mask information each of which indicates a storage area not to be searched, and makes a search on the basis of a search key corresponding to each piece of applied mask information by applying a piece of mask information designated in each piece of applied mask information.

8. The data relay apparatus according to claim 1, wherein the content addressable/associative memory device includes a register group for storing the plurality of search conditions, stores a search condition in the register group each time the content addressable/associative memory device receives the search request, extracts each search condition in order of storage, and makes a search according to each search condition extracted.

9. The data relay apparatus according to claim 1, wherein the content addressable/associative memory device includes definition information which defines the data structure of the search request, and analyzes the search request in accordance with the definition information.

10. A content addressable/associative memory device having the function of searching stored information to be searched, the device comprising:
    a data storage circuit for storing a plurality of pieces of information to be searched;
    an analysis circuit for generating, at the time of a search request including a plurality of search keys and a plurality of pieces of applied mask information each of which indicates an area to be searched by each of the plurality of search keys being inputted, a plurality of search conditions each including a search key and a piece of applied mask information by analyzing the structure of the search request; and
    a search circuit for searching the data storage circuit for a piece of information to be searched corresponding to each search condition generated by the analysis circuit, and for outputting a memory address uniquely associated with the detected piece of information to be searched.

11. The content addressable/associative memory device according to claim 10, further comprising a plurality of register groups, wherein:
    the analysis circuit stores the plurality of search conditions generated by analyzing the search request in the plurality of register groups; and
    the search circuit extracts the plurality of search conditions in the order in which the plurality of search conditions are stored in the plurality of register groups, and performs a search process according to the plurality of search conditions extracted.

12. A content addressable/associative memory device use information search method for searching for information regarding a packet by using a content addressable/associative memory device, the method comprising the steps of:
    outputting, by a network processor, a search request including a plurality of elements in the inputted packet treated as a plurality of search keys and a plurality of pieces of applied mask information each of which indicates an area to be searched by each of the plurality of search keys;
    analyzing the structure of the search request and generating a plurality of search conditions each including a search key and a piece of applied mask information;
    searching a plurality of pieces of information to be searched which are stored in advance in the content addressable/associative memory device for a piece of information to be searched corresponding to a search condition, and outputting a memory address uniquely associated with the piece of information to be searched corresponding to the search condition; and
    outputting a stored candidate search result associated with the memory address from a memory device in which a plurality of candidate search results are stored as a search result.

* * * * *